Figure 1:
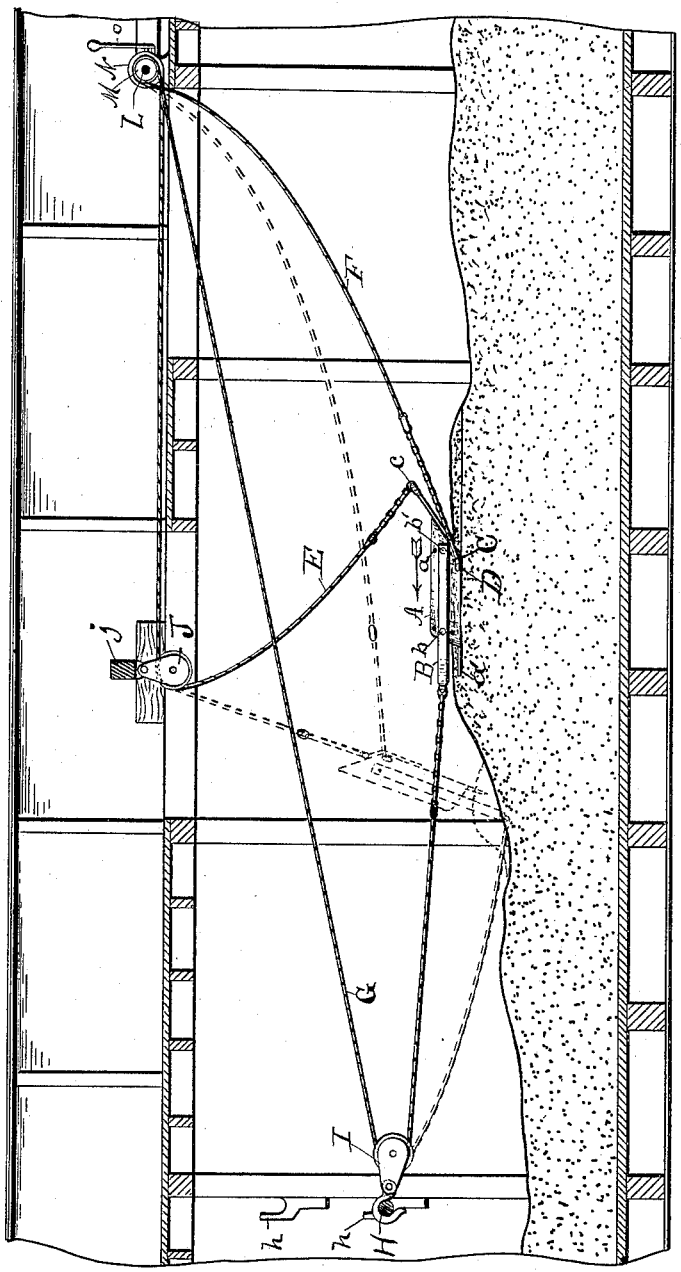

(No Model.)  2 Sheets—Sheet 1.

W. G. TRAVERS.
VESSEL TRIMMER.

No. 391,928. Patented Oct. 30, 1888.

Witnesses,
W. J. Bainbridge.
L. Watson.

Inventor,
William G. Travers.
By Watson & Thurston,
Attorneys.

(No Model.) 2 Sheets—Sheet 2.
W. G. TRAVERS.
VESSEL TRIMMER.
No. 391,928. Patented Oct. 30, 1888.
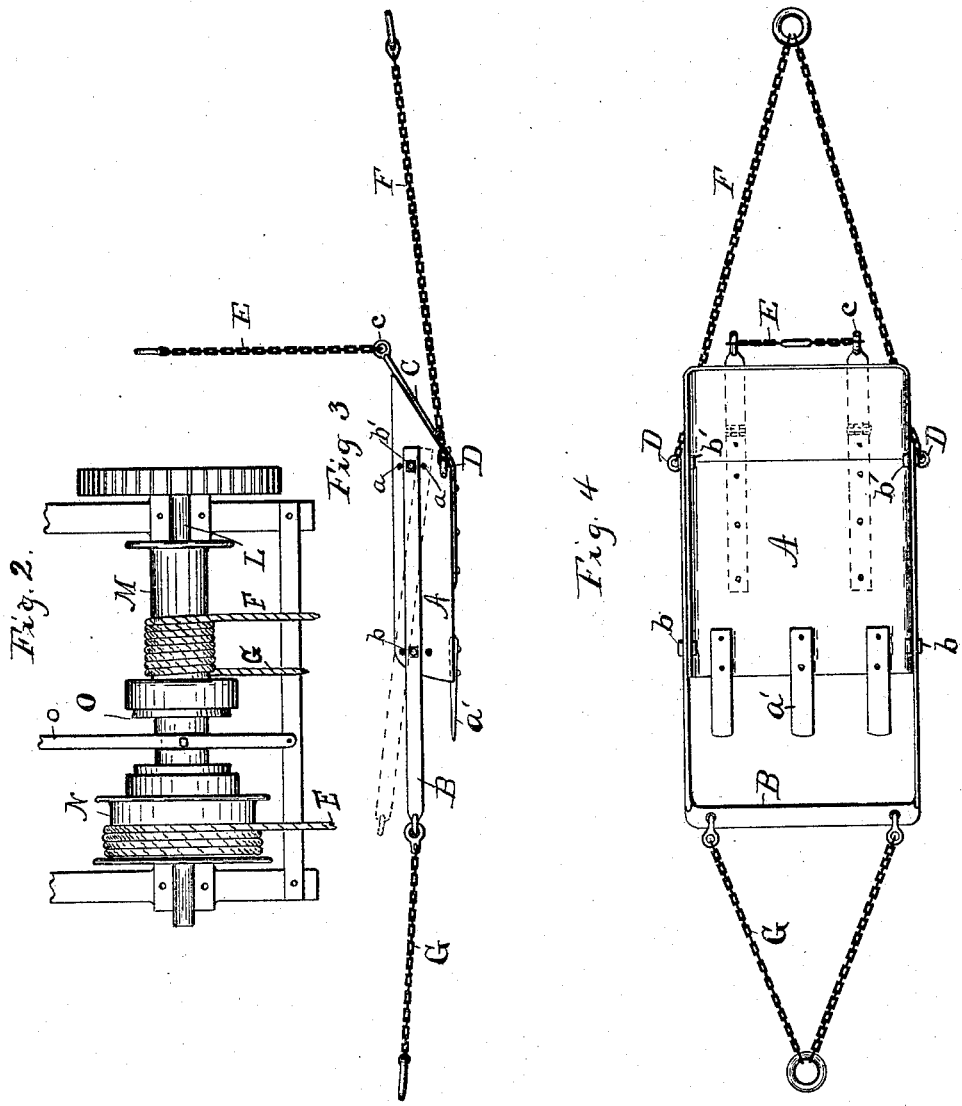

United States Patent Office.

WILLIAM G. TRAVERS, OF CONNEAUT, OHIO.

VESSEL-TRIMMER.

SPECIFICATION forming part of Letters Patent No. 391,928, dated October 30, 1888.

Application filed May 7, 1888. Serial No. 273,028. (No model.)

*To all whom it may concern:*

Be it known that I, WILLIAM G. TRAVERS, a citizen of the United States, residing at Conneaut, in the county of Ashtabula and State of Ohio, have invented certain new and useful Improvements in Vessel-Trimmers, of which the following is a full, clear, and exact description, reference being had to the accompanying drawings.

In loading vessels with ore, coal, and other like cargoes, the material being thrown down the hatchways would, unless removed, soon accumulate in heaps. It is necessary, in order to insure the safety of the vessel, to level these heaps and spread the cargo evenly within the hold, and this is now generally done by men who are known as "trimmers."

The object of my invention is to provide a simple and easily-controlled mechanical device whereby the trimming of a vessel may be quickly and cheaply done.

To this end it consists in the construction and combination of parts herein shown, described, and pointed out definitely in the claims.

Referring to the drawings, Figure 1 is a side elevation of my device in operative position within the hold of a vessel, the motive power being on the deck thereof. Fig. 2 is a top plan view of the winding-drums. Fig. 3 is a side elevation of the scoop. Fig. 4 is a top plan view therof.

In the drawings, A represents a scoop open at the front end, having slightly-flaring sides and back. A bail, B, is secured to the sides by means of pivot-bolts $b\ b'$, which pass through the sides of the scoop and the bail. The bail extends backward along the sides, and its rear ends are provided with adjustable connections with the sides, whereby when the scoop is drawn forward by the cable attached to the bail the nose thereof will be turned more or less downward at an angle with said bail. These adjustable connections in the form shown consist of bolts $b'\ b'$, which pass through holes in the bail and through one of a series of holes, $a$, in each side of the scoop, which last holes are arranged in the arc of a circle, with the pivot-bolts $b$ as a center. Upon the front edge of the scoop are fastened, by bolts or otherwise, the teeth or spurs $a'$. When the scoop is being drawn forward to pick up a load of coal or ore, these teeth are of great service, because, besides saving the edge of the scoop, they set between lumps and turn them so that they are gathered in by the scoop, which, without these teeth, would in many cases ride over said lumps without disturbing them.

C C represent strap-hinges, one leaf of each hinge being bolted to the bottom of the scoop and turned up along the back thereof. The other leaf of each hinge has an eyebolt, $c$, at its end, to which is attached one division of what I term the "dumping-cable" E. Upon the sides of the scoop, near the rear end and as near the bottom as practical, are fixed eyebolts D D, to which are attached the return-cable F. At a suitable distance in front of the scoop a bar or chain, H, is extended across the hold and secured to the stanchions or other appropriate supports. In the form shown the uprights are provided with brackets $h$, arranged at different heights, and a bar, H, may be sustained by these brackets at any desired height. To this transverse bar or chain a pulley-block, I, is removably secured, and the draft-cable G, which is fastened to the bail B, passes through this block and up through one of the hatchways to the actuating mechanism on the deck.

A suitable block or pulley, J, is secured to a bar, $j$, which is sustained at its ends across one of the hatchways in such a position that the dumping-cable may pass up through said hatchways over the block J and along the deck to the actuating mechanism. The return-cable F passes from the eyebolts D through the same hatchway that the cable G does to the actuating mechanism.

The actuating mechanism, as shown, consists of a shaft, L, driven by suitable connections with the engine. Upon this shaft is loosely mounted a drum, M, upon which is wound in reverse directions the cables G and F, so that the winding up of one cable will unwind the other. Upon the same shaft a drum, N, is loosely mounted, upon which drum the cable E is wound. Between the two drums is a double clutch, O, of any suitable form, arranged to engage either of said drums while the other runs loose.

In operation, when the scoop is in a position for engaging the pile of ore or coal, the drum M is engaged with the shaft by the clutch O, and the draft-cable G is wound up, the cable F unwinding at the time from the same drum, while the cable E unwinds freely from the loose drum N. As the scoop is drawn forward, the teeth *a* engage with the lumps, turning them over and getting them into position where they are gathered in by the scoop, which is drawn forward to the place it is desired to dump it. At a signal the clutch is shifted by a suitable lever, *o*, to engage with the drum N, and the cable E is wound upon the same, and the rear end of the scoop lifted to let the load fall out, the hinged connections with the scoop permitting a greater freedom in its movement and insuring the dumping of the load. The clutch O is then shifted to engage with the drum M, and the direction in which the shaft L revolves is reversed. This winds up the cable E, the first effect being to return the scoop to its former substantially horizontal position on its bottom. It then draws the scoop backward, which slides to a certain extent upon the straps of the hinges C as runners, which saves wear on the bottom of the scoop, to the proper point, when this operation is repeated. There is sufficient slack left between the cables F and G, so that there will be no binding when one is winding and the other unwinding.

The position of the block I may be shifted from time to time, as required, along the bar or chain H, and the position of said bar or chain may be changed, as required, so that the cargo may be distributed evenly in all parts of the hold.

It is evident the particular form of actuating mechanism may be varied without changing other parts of the invention, and also that the position of the block J may be changed as required, and that other blocks may be employed, as required, to properly direct the various cables to the winding mechanism.

Having thus described my invention, what I claim as new, and desire to secure by Letters Patent, is—

1. The combination of a scoop having an adjustable bail secured to its sides, and strap-hinges secured to the rear part thereof, with the blocks I and J, the cables E, F, and G, and suitable actuating mechanism, substantially as and for the purpose specified.

2. The combination of a scoop, an adjustable bail secured to the sides thereof, teeth secured to its front edge, strap-hinges secured to the bottom and back thereof, and eyebolts secured to the sides, near the rear end thereof, substantially as and for the purpose specified.

WILLIAM G. TRAVERS.

Witnesses:
E. L. THURSTON,
W. J. BAINBRIDGE.